(12) United States Patent
Dwork et al.

(10) Patent No.: US 7,188,106 B2
(45) Date of Patent: Mar. 6, 2007

(54) SYSTEM AND METHOD FOR AGGREGATING RANKING RESULTS FROM VARIOUS SOURCES TO IMPROVE THE RESULTS OF WEB SEARCHING

(75) Inventors: Cynthia Dwork, San Francisco, CA (US); Simeon Naor, Matam (IL); Shanmugasundaram Ravikumar, San Jose, CA (US); Dandapani Sivakumar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/136,911

(22) Filed: Apr. 30, 2002

(65) Prior Publication Data

US 2003/0037074 A1    Feb. 20, 2003

Related U.S. Application Data

(60) Provisional application No. 60/288,201, filed on May 1, 2001.

(51) Int. Cl.
 *G06F 17/30*    (2006.01)
(52) U.S. Cl. ................ 707/5; 707/3; 707/4; 707/6; 707/10
(58) Field of Classification Search ............. 707/2–6, 707/10
 See application file for complete search history.

(56) References Cited

U.S. PATENT DOCUMENTS

| | | | |
|---|---|---|---|
| 5,675,819 A | 10/1997 | Schuetze | 395/760 |
| 5,864,846 A | 1/1999 | Voorhees et al. | 707/5 |
| 5,873,080 A | 2/1999 | Coden et al. | 707/3 |
| 5,893,092 A | 4/1999 | Driscoll | 707/5 |
| 5,956,707 A | 9/1999 | Chu | 707/3 |
| 5,987,446 A | 11/1999 | Corey et al. | 707/3 |
| 6,006,218 A * | 12/1999 | Breese et al. | 707/3 |
| 6,012,053 A | 1/2000 | Pant et al. | 707/3 |
| 6,014,664 A | 1/2000 | Fagin et al. | 707/5 |
| 6,018,733 A | 1/2000 | Kirsch et al. | 707/3 |
| 6,101,491 A | 8/2000 | Woods | 707/3 |
| 6,119,124 A | 9/2000 | Broder et al. | 707/103 |
| 6,298,344 B1 * | 10/2001 | Inaba et al. | 707/5 |
| 6,327,590 B1 * | 12/2001 | Chidlovskii et al. | 707/5 |
| 6,356,899 B1 | 3/2002 | Chakrabarti et al. | 707/5 |
| 6,526,440 B1 * | 2/2003 | Bharat | 709/219 |
| 6,633,868 B1 * | 10/2003 | Min et al. | 707/3 |
| 6,708,174 B1 * | 3/2004 | Tenorio | 707/10 |
| 6,901,402 B1 * | 5/2005 | Corston-Oliver et al. | 707/101 |

OTHER PUBLICATIONS

Keith A. Baggerly, Visual Estimation of Structure in Ranked Data, May 1995, pp. 1-116.*

Moni Naor, Cynthia Dwork, Ravi Kumar, D. Sivakumar, Rank aggregation, spam resistance, and social choice, 1999-2000, pp. 1-16.*

(Continued)

*Primary Examiner*—Cam-Y Truong
(74) *Attorney, Agent, or Firm*—Marc D. McSwain

(57) ABSTRACT

A system and method for aggregating rankings from a plurality of ranking sources to generate a maximally consistent ranking by minimizing a distance measure. The ranking sources may be search engines executing queries on web pages that have been deliberately modified to cause an incorrect estimate of their relevance. The invention supports combining partial rankings.

12 Claims, 5 Drawing Sheets

OTHER PUBLICATIONS

Vu Ha, Toward Case-based Preference Elicitation: Similarity Measures on Preference Structures Jan. 17, 2000, pp. 1-13.*

M. Adler, P. Gemmell, M. Harchol-Balter, R. Karp, and C. Kenyon. *Selection in the presence of noise: The design of playoff systems*. Proc. 5th Symposium on Discrete Algorithms, pp. 564-573, 1994.

A. Anderson and O. Peterssoni. *Approximate indexed lists*. J. Algorithms, 29:256-276, 1998.

B.T. Bartell, G.W. Cottrell, and R.K. Belew. *Automatic combination of multiple ranked retrieval systems*. In Seventeenth Annual International ACM SIGIR Conference on Research and Development in Information Retrieval, 1994. citeseer.nj.nec.com/bartel194automatic.html.

J. Barzilai, W.D. Cook, and M. Kress. *Generalized Network Formulation of the Pairwise Comparison Consensus Ranking Model*. Management Science, v. 32, n. 8, pp. 1007-1014, Aug. 1986.

K. Bharat and M. Henziger. *Improved algorithms for topic distillation in a hyperlinked environment*. In Twenty-first ACM SIGIR Conference on Research and Development in Information Retrieval, pp. 104-111, 1998.J.

S. Brin and L. Page. *The anatomy of a large-scale hypertextual Web search engine*. Computer Networks, 30(1-7):107-117, 1998.

W.W. Cohen, R.E. Schapire, and Y. Singer. *Learning to order things*. J. of Artificial Intelligence Research, 10:243-270, 1999.

W.D. Cook, M. Kress, and L.M. Seiford. *An Axiomatic Approach to Distance on Partial Orderings*. RAIRO Recherche Operationelle / Operations Research, v. 20, n. 2, pp. 115-122, May 1986.

W.D. Cook, M. Kress, and L.M. Seiford, *A general framework for distance based consensus in ordinal ranking models*. Eur. J. Oper. Res. (Netherlands), v. 96, n. 2, Jan. 24, 1997, p. 392-397.

G. Even, J. Naor, B. Schieber, and M. Sudan. *Approximating minimum feedback sets and multicuts in directed graphs*. Algorithmica, 20(2):151-174, 1998.

R. Fagin. *Combining fuzzy information from multiple systems*. Proceedings of the Fifteenth ACM SIGACT SIGMOD SIGART Symposium on Principles of Database Systems, PODS1996, pp. 216-226, 1996.

Y. Freund, R. Iyer, R.E. Schapire, and Y. Singer. *An efficient boosting algorithm for combining preferences*. Proc. 15th International Conference on Machine Learning, 1998.

B. Friedman and H. Nissenbaum. *Bias in computer systems*. ACM Transactions on Information Systems, 14(3):330-347, 1996.

M.E. Glickman. *Parameter estimation in large dynamic paired comparison experiments*. Applied Statistics, 48:377-394, 1999.

L. Gravano and H. Garcia-Molina. *Merging ranks from heterogeneous internet sources*. Technical Report SIDL-WP1997-0063, Dept. of Computer Science, Stanford Univ., Stanford, CA, Feb. 1997. citeseer.nj.nec.com/gravano97merging.html.

E. Hemaspaandra, L.A. Hemaspaandra, and J. Rothe. *Exact analysis of Dodgson elections: Lewis Carroll's 1876 voting system is complete for parallel access to NP*. Proc. International Colloquium on Automata, Languages, and Programming, pp. 214-224, 1997.

L.D. Introna and H. Nissenbaum. *The internet as a democratic medium: Why the politics of search engines matters*, The Information Society 16, p. 1-17, 2000.

J. Kleinberg. *Authoritative sources in a hyperlinked environment*. J. of the ACM, 46(5):604-632, 1999.

S. Lawrence and C.L. Giles. *Inquirus, the NECI meta search engine*. Computer Networks and ISDN Systems, Proceedings of the Seventh International World Wide Web Conference, v. 30, n. 1-7, Apr. 14-18, 1998, pp. 95-105.

D. M. Pennock and E. Horvitz. *Analysis of the axiomatic foundations of collaborative filtering*. Workshop on AI for Electronic Commerce at the 16th National Conference on Artificial Intelligence, 1999.

D.M. Pennock, P. Maynard-Reid II, C.L. Giles, and E. Horvitz. *A normative examination of ensemble learning algorithms*. Proc. 17th International Conference on Machine Learning, 2000, pp. 735-742.

D.M. Pennock, E. Horvitz, and C.L. Giles, *Social choice theory and recommender systems Analysis of the axiomatic foundations of collaborative filtering*. Proc. Of the 17th National Conference on Artificial Intelligence, 2000.

D.G. Saari. *The mathematics of voting: Democratic symmetry*. Economist, pp. 83, Mar. 4, 2000.

D. Sullivan. *Paid inclusion at search engines gains ground*. www.searchenginewatch.com/sereport/00/11-inclusion.html, Nov. 3, 2000.

D. Sullivan. *Nielsen/NetRatings search engine ratings*. www.searchenginewatch.com/reports/netratings.html, Mar. 4, 2002.

M. Truchon. *An extension of the Condorcet criterion and Kemeny orders*. Cahier 98-15 du Centre de Recherche en Economie et Fiannce Appliquees, 1998.

* cited by examiner

FIG. 1

SPEARMAN FOOTRULE DISTANCE
- FOR TWO FULL LISTS σ AND τ
WHERE i = # OF ELEMENTS IN SET
$F(\sigma,\tau) = \Sigma_i \mid \sigma(i) - \tau(i) \mid$

| i | σ | τ |
|---|---|---|
| 1 | APPLE | APPLE |
| 2 | ORANGE | CHERRY |
| 3 | BANANA | PEACH |
| 4 | PEACH | BANANA |
| 5 | CHERRY | ORANGE |

$F(\sigma,\tau) = \mid 1\text{-}1 \mid + \mid 2\text{-}5 \mid + \mid 3\text{-}4 \mid + \mid 4\text{-}3 \mid + \mid 5\text{-}2 \mid = 0 + 3 + 1 + 1 + 3 = 8$ TO NORMALIZE, DIVIDED BY $0.5\ i^2 = 12.5$

NORMALIZED VALUE = 8 / 12.5 = 0.64

FIG. 2

KENDALL TAU DISTANCE
- FOR TWO FULL LISTS σ AND τ
WHERE i = # OF ELEMENTS IN SET
$K(\sigma,\tau) = | \{(i,j): i<j, \sigma(i)<\sigma(j) \text{ but } \tau(i)>\tau(j) \} |$

| i | σ | τ |
|---|---|---|
| 1 | APPLE | APPLE |
| 2 | ORANGE | CHERRY |
| 3 | BANANA | PEACH |
| 4 | PEACH | BANANA |
| 5 | CHERRY | ORANGE | for (i=1) (j=2) no disagreement
for (i=1) (j=3) no disagreement
for (i=1) (j=4) no disagreement
for (i=1) (j=5) no disagreement
for (i=2) (j=3) disagreement
for (i=2) (j=4) disagreement
for (i=2) (j=5) disagreement
for (i=3) (j=4) disagreement
for (i=3) (j=5) disagreement
for (i=4) (j=5) disagreement
total disagreements = 6

TO NORMALIZE, DIVIDED BY 0.5 i (i-1) = 10

NORMALIZED VALUE = 6 / 10 = 0.6

NORMALIZED FOOTRULE DISTANCE
FOR A COLLECTION OF LISTS
WHERE i = # OF ELEMENTS IN SET
AND k = # OF LISTS BEING COMPARED TO $\sigma$
$F(\sigma, \tau_1, ..., \tau_k) = (1/k) \Sigma_i F(\sigma, \tau_i)$ $F(\sigma, \tau_1, ..., \tau_k) = (F_1 + F_2 + F_3 + F_4 + F_5) / 5$

FIG. 4

SCALED FOOTRULE DISTANCE
- FOR ONE FULL LIST $\sigma$ AND ONE PARTIAL LIST $\tau$
WHERE i = # OF ELEMENTS IN SET
$SF(\sigma,\tau) = \Sigma_{i\, in\, \tau}\, |\, \sigma(i)/|\sigma| - \tau(i)/|\tau|\, |$

| i | $\sigma$ | $\tau$ |
|---|----------|--------|
| 1 | APPLE    | APPLE  |
| 2 | ORANGE   | CHERRY |
| 3 | BANANA   | PEACH  |
| 4 | PEACH    | BANANA |
| 5 | CHERRY   |        |

$SF(\sigma,\tau) = |\, (1/5) - (1/4)\, | + |\, (5/5) - (2/4)\, | + |\, (4/5) - (3/4)\, | + |\, (3/5) - (4/4)\, | = 1$ TO NORMALIZE, DIVIDE BY 0.5 |t| = 2

NORMALIZED VALUE = 1 / 2 = 0.5 though the invention is
SYSTEM AND METHOD FOR AGGREGATING RANKING RESULTS FROM VARIOUS SOURCES TO IMPROVE THE RESULTS OF WEB SEARCHING

CROSS-REFERENCE TO RELATED APPLICATION

This application claims priority benefit of and hereby incorporates by reference the entirety of U.S. Provisional Patent Application No. 60/288,201, filed on May 1, 2001.

FIELD OF THE INVENTION

This invention relates to aggregating rankings from various sources, and more specifically to methods of improving the results of web searching. In particular, the invention is intended to combat "spam" or deliberate manipulations by web page authors to mislead web search engines into giving an undeservedly high rank to their web pages.

DESCRIPTION OF RELATED ART

The rank aggregation problem is to combine many different rank orderings on the same set of candidates, or alternatives, in order to obtain a "better" ordering. There are many situations in which the task of ranking a list of several alternatives based on one or more criteria is necessary. When there is a single criterion (or "judge") for ranking, the task is relatively easy and is simply a reflection of the judge's opinions and biases. In contrast, computing a "consensus" ranking of the alternatives, given the individual ranking preferences of several judges, is not so easy. A specific and important example of such a rank aggregation problem arises in the context of the World Wide Web (referred to in this application interchangeably as the internet or the web).

As the volume of data accessible via computer continues to increase, the need for automated tools for efficient retrieval of relevant information from that data also increases. Many people use the web to access a wide variety of information. Queries to search engines are routinely employed to find relevant information on the many web pages available. Search engines are remotely accessible programs that perform keyword searches for information, often on web data.

Search engines typically return dozens or hundreds of URLs (universal resource locators, which are essentially web site addresses) that the search engines have determined are related to user-specified keywords or search phrases. Many search engines also provide a relevance ranking, which is a relative numerical estimate of the statistical likelihood that the material at a given URL will be of interest in comparison to other documents. Relevance rankings are often based on the number of times a keyword or search phrase appears in a document, its placement in the document (for example, a keyword in the title is often deemed more relevant than one at the end of the page), and the size of the document. Link analysis has also come to be known as a very powerful technique in ranking web pages and other hyperlinked documents. Anchor-text analysis, page structure analysis, the use of keyword listings and the URL text itself are other well-motivated heuristics intended to exploit a wealth of available information.

There are at least two dozen general purpose search engines available for use, as well as many special purpose search engines. The very fact that there are so many choices is an indication that no single search engine has proven to be satisfactory for all web users. There are several reasons why this is the case. First, no one ranking method can be considered broadly acceptable; that is, no single ranking function can be trusted to perform well for all queries. Second, no one search engine is sufficiently comprehensive in its coverage of the web. Further, some data are not easily handled by simple ranking functions. For example, search engines have more difficulty with queries about multimedia documents than with queries about text documents. U.S. Pat. No. 5,873,080 to Coden et al., hereby incorporated by reference, describes the use of multiple search engines to search multimedia data. U.S. Pat. No. 6,014,664 to Fagin et al., hereby incorporated by reference, describes the use of incorporating weights into combinational rules to produce a combined scoring function for a database.

Creators of web pages also complicate the problem of information retrieval and ranking through deliberate efforts to ensure that their pages are presented to a user. Some search engines are currently pursuing paid placement and paid inclusion business models, wherein web page creators effectively pay for the search engine to generate a higher rank for their web pages. Users of such search engines may not have any form of protection against such deliberate ranking biases. Some web page creators are resorting to more nefarious means to induce search engines to generate higher rank figures for their web pages. Deliberate manipulation of web pages by their authors in an attempt to achieve an undeservedly high rank from search engines is referred to as "spamming" or creating "spam". Such manipulation can include putting hundreds of copies of keywords in a web page to confuse a search engine into overestimating the relevance of the web page. The end result is that the user who ran the search engine query is given highly ranked web pages that may not be truly relevant.

A computationally efficient method for providing a degree of robustness of search results from a number of search engines in view of the various shortcomings and biases of individual search engines described above is therefore needed.

Improvements in aggregate ranking methods may also be important in applications other than meta-searching with improved spam elimination. These applications include situations where user preferences span a variety of criteria, and the logic of classifying a document as acceptable or unacceptable is difficult to encode into any simple query form. Typical examples include multi-criteria selection and word association queries.

Multi-criteria selection scenarios arise when users try to choose a product from a database of products. Although an airline reservation system is flexible enough to let the user specify various preference criteria (travel dates/times, window/aisle seating, number of stops, frequent-flier preferences, refundable/non-refundable tickets, and of course, price), it may not allow the user to specify a clear order of importance among the criteria. Similarly, in choosing restaurants from a restaurant database, users might rank restaurants based on several different criteria (cuisine, driving distance, ambiance, star-rating, dollar-rating, etc.). In both these examples, users might be willing to compromise one or more of the criteria, provided there is a clear benefit with respect to the others. Ranking a database with respect to several individual criteria, then applying a good aggregation function, may prove to be an effective method for handling multi-criteria selection situations.

Word association queries are employed when a user wants to search for a good document on a topic; the user typically knows a list of keywords that collectively describe the topic, but isn't sure that the best document on the topic necessarily contains all of them. This is a very familiar dilemma for web searchers: when keywords are supplied to a search engine, do users ask for documents that contain all the keywords, or just for documents that contain any of the keywords? The former may produce no useful documents, or too few of them, while the latter may produce an enormous list of documents where it is not clear which one to choose as the best. These concerns may be addressed by improvements in associations ranking, wherein the database is ranked with respect to several small subsets of the queries, and these rankings are then aggregated. Typically, the aggregation function is given no information about how the input lists were generated. In the web environment, input lists are usually generated by search engines that may be modified at any time, without notice. In this setting, there may be no opportunity for training an aggregation system before aggregation is required.

Users may also wish to compare the performance of various search engines via an improved rank aggregation method. A good search engine is one that produces results that are close to the aggregated ranking. However, any method for rank aggregation for web applications must be capable of dealing with the fact that only the top few hundred entries of each ranking are made available by each search engine. This limitation is imposed in the interest of efficiency and to ensure the confidentiality of the engines' particular ranking algorithms.

SUMMARY OF THE INVENTION

It is accordingly an object of this invention to devise a system and method for aggregating rankings from a plurality of ranking sources to generate a maximally consistent ranking by minimizing a distance measure.

It is a related object of this invention to aggregate rankings from the situation wherein the ranking sources are search engines executing queries on web pages that may have been deliberately modified to cause an incorrect estimate of their relevance.

It is a related object of this invention to aggregate rankings when a number of ranking sources may produce only a partial list. In the case where partial lists are to be aggregated, a union of partial lists is computed, and an induced distance measure between each partial list and the projection of a full list with respect to the union of partial lists is computed.

Different distance measures for comparing lists to each other and for comparing a single list to a collection of lists are described. The Spearman footrule distance for two full lists is the sum of the absolute values of the difference between the rank of element i in one list versus the rank of element i in the other list. The Kendall tau distance for two full lists is a count of the number of pairwise ranking disagreements between the two lists.

The aggregation obtained by optimizing total Kendall tau distance is called a Kemeny optimal aggregation; unfortunately, finding a Kemeny optimal aggregation is NP-hard. A far less computationally expensive yet natural relaxation, termed a local Kemeny optimal aggregation, is computed by optimizing the total Spearman footrule distance. It is a related object that the invention utilizes a crucial property of such solutions, termed the "extended Condorcet criterion", to combat deliberate web site modifications and resulting incorrect estimates of their relevance. The invention minimally modifies any initial aggregation via local Kemenization to have this crucial property. The initial aggregation may be obtained by using Markov chains.

It is a related object of the invention to minimize the total distance between lists by computing a minimum cost perfect matching in a bipartite graph.

It is a related object of the invention to use heuristics defining Markov chain state transition probabilities to combine partial comparison information, derived from individual rankings, into a total ordering. The states of the Markov chains correspond to candidate web pages to be ranked, and the Markov chain ordering is the output aggregated ordering.

The foregoing objects are believed to be satisfied by the embodiments of the present invention as described below.

BRIEF DESCRIPTION OF THE DRAWINGS

FIG. 1 is a diagram of the computation of Spearman footrule distance.

FIG. 2 is a diagram of the computation of Kendall tau distance.

FIG. 4 is a diagram of the computation of scaled footrule distance given a full list and a partial list.

DETAILED DESCRIPTION OF THE PREFERRED EMBODIMENTS

Types of Lists

Figure 3:
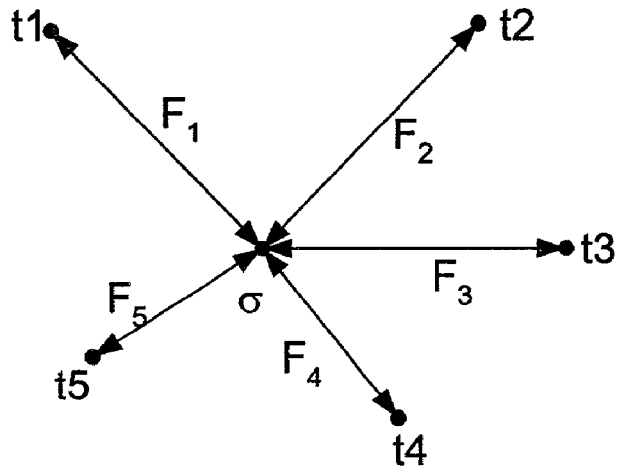
FIG. 3 is a diagram of the computation normalized footrule distance for a collection of lists.

Given a universe U, an ordered list (or simply, a list) $\tau$ with respect to U is an ordering (aka ranking) of a subset S of U, i.e., $\tau = [x_1 > x_2 > \ldots > x_d]$, with each $x_i$ in S, and $>$ is some ordering relation on S. Also, if i in U is present in $\tau$, let $\tau(i)$ denote the position or rank of i (a highly ranked or preferred element has a low-numbered position in the list). For a list $\tau$, let $|\tau|$ denote the number of elements. By assigning a unique identifier to each element in U, one may assume without loss of generality that $U = \{1, 2, \ldots, |U|\}$.

Depending on the kind of information present in $\tau$, three situations arise:

(1) If $\tau$ contains all the elements in U, then it is said to be a full list. Full lists are, in fact, total orderings (permutations) of U. For instance, if U is the set of all pages indexed by a search engine, it is easy to see that a full list emerges when one ranks pages (say, with respect to a query) according to a fixed algorithm.

(2) There are situations where full lists are not convenient or even possible. For instance, let U denote the set of all web pages in the world. Let $\tau$ denote the results of a search engine in response to some fixed query. Even though the query might induce a total ordering of the pages indexed by the search engine, since the index set of the search engine is almost surely only a subset of U, there is a strict inequality $|\tau| < |U|$. In other words, there are pages in the world which are unranked by this search engine with respect to the query. Such lists that rank only some of the elements in U are called partial lists.

(3) A special case of partial lists is the following. If S is the set of all the pages indexed by a particular search engine and if $\tau$ corresponds to the top 100 results of the search engine with respect to a query, clearly the pages that are not present in list $\tau$ can be assumed to be ranked below 100 by the search engine. Such lists that rank only a subset of S and where it is implicit that each ranked element is above all unranked elements, are called top d lists, where d is the size of the list. A natural operation of projection will be useful. Given a list τ and a subset T of the universe U, the projection of τ with respect to T (denoted $\tau_{/T}$ will be a new list that contains only elements from T. Notice that if τ happens to contain all the elements in T, then $\tau_{/T}$ is a full list with respect to T.

Concepts From Graph Theory

A graph G=(V, E) consists of a set of nodes V and a set of edges E. Each element e in E is an unordered pair (u, v) of incident nodes, representing a connection between nodes u and v. A graph is connected if the node set cannot be partitioned into components such that there are no edges whose incident nodes occur in different components.

A bipartite graph G=(U, V, E) consists of two disjoint sets of nodes U, V such that each edge e in E has one node from U and the other node from V. A bipartite graph is complete if each node in U is connected to every node in V. A matching is a subset of edges such that for each edge in the matching, there is no other edge that shares a node with it. A maximum matching is a matching of largest cardinality. A weighted graph is a graph with a (non-negative) weight for every edge e. Given a weighted graph, the minimum weight maximum matching is the maximum matching with minimum weight. The minimum weight maximum matching problem for bipartite graphs can be solved in time $O(n^{2.5})$, where n is the number of nodes.

A directed graph consists of nodes and edges, but this time an edge is an ordered pair of nodes (u, v), representing a connection from u to v. A directed path is said to exist from u to v if there is a sequence of nodes $u=w_0, \ldots, w_k=v$ such that ($w_i, w_{i+1}$) is an edge, for all $i=0, \ldots, k-1$. A directed cycle is a non-trivial directed path from a node to itself. A strongly connected component of a graph is a set of nodes such that for every pair of nodes in the component, there is a directed path from one to the other. A directed acyclic graph (DAG) is a directed graph with no directed cycles. In a DAG, a sink node is one with no directed path to any other node.

A (homogeneous) Markov chain for a system is specified by a set of states S={1, 2, ..., n } and an n by n non-negative, stochastic (i.e., the sum of each row is 1) matrix M. The system begins in some start state in S and at each step moves from one state to another state. This transition is guided by M: at each step, if the system is in state i, it moves to state j with probability $M_{ij}$. If the current state is given as a probability distribution, the probability distribution of the next state is given by the product of the vector representing the current state distribution and M. In general, the start state of the system is chosen according to some distribution x (usually, the uniform distribution) on S. After t steps, the state of the system is distributed according to $xM^t$. Under some niceness conditions on the Markov chain, irrespective of the start distribution x, the system eventually reaches a unique fixed point where the state distribution does not change. This distribution is called the stationary distribution. It can be shown that the stationary distribution is given by the principal left eigenvector y of M, i.e., $yM=\lambda y$. In practice, a simple power-iteration algorithm can quickly obtain a reasonable approximation to y.

The entries in y define a natural ordering on S. Such an ordering is termed the Markov chain ordering of M. A technical point to note while using Markov chains for ranking is the following. A Markov chain M defines a weighted graph with n nodes such that the weight on edge (u, v) is given by $M_{u,v}$. The strongly connected components of this graph form a DAG. If this DAG has a sink node, then the stationary distribution of the chain will be entirely concentrated in the strongly connected component corresponding to the sink node. In this case, only an ordering of the alternatives present in this component is obtained; if this happens, the natural extended procedure is to remove these states from the chain and repeat the process to rank the remaining nodes. Of course, if this component has sufficiently many alternatives, one may stop the aggregation process and output a partial list containing some of the best alternatives. If the DAG of connected components is (weakly) connected and has more than one sink node, then one will obtain two or more clusters of alternatives, which one could sort by the total probability mass of the components. If the DAG has several weakly connected components, one will obtain incomparable clusters of alternatives. Thus, when one refers to a Markov chain ordering, one refers to the ordering obtained by this extended procedure.

Distance Measures

How does one measure distance between two full lists with respect to a set S? Two popular distance measures are:
(1) The Spearman footrule distance is the sum, over all elements i in S, of the absolute difference between the rank of i according to the two lists. Formally, given two full lists σ and τ, their Spearman footrule distance is given by $F(\sigma, \tau)=\Sigma_i|\sigma(i)-\tau(i)|.$ This distance measures the displacement of each element between the two rankings σ and τ. After dividing this number by the maximum value $(½)|S|^2$, one can obtain a normalized value of the footrule distance, which is always between 0 and 1. The footrule distance between two lists can be computed in linear time.

Referring now to FIG. 1, a diagram of the computation of Spearman footrule distance is shown. Two full lists (with i=5) are given:

σ={APPLE, ORANGE, BANANA, PEACH, CHERRY} and

τ={APPLE, CHERRY, PEACH, BANANA, ORANGE}.

Each item in the lists could represent a URL returned by a search engine, for example. The displacement of each element is computed, summed, and normalized as described above.

(2) The Kendall distance counts the number of pairwise disagreements between two lists; that is, the distance between two lists σ and τ is $K(\sigma, \tau)=|\{(i, j): i<j, \sigma(i)<\sigma(j) \text{ but } \tau(i)>\tau(j)\}|.$ Note that if it is not the case that both i and j appear in both lists σ and τ, then the pair (i,j) contributes nothing to the Kendall distance between the two lists. Dividing this number by the maximum possible value (½)S(S–1) produces a normalized version of the Kendall distance.

Referring now to FIG. 2, a diagram of the computation of Kendall tau distance is shown. Two full lists are given as in FIG. 1, and the number of pairwise disagreements is summed as described above, and the result is normalized.

For any two partial lists where K(σ, τ)=K(τ, σ) and if a and X are full lists, then K is a metric (this is not true in general, e.g., consider three lists one of which is empty—the distance to an empty list is always zero). In this case, K is known as the Kendall tau distance between the lists and it corresponds to the number of pairwise adjacent transpositions bubble sort requires to turn σ into τ. By definition it is possible to compute $K(σ, τ)$ in $O(n^2)$ time, although with simple data structures it can be computed in $O(n \log n)$ time, and with sophisticated data structures one can improve the time to $O(n \log n/\log \log n)$.

The above measures extend in a natural way to encompass several lists. Given several full lists $σ, τ_1, \ldots τ_k$, for instance, the normalized footrule distance of σ to $τ_1, \ldots, τ_k$ is given by:

$$F(σ, τ_1, \ldots τ_k) = (1/k) \Sigma_i F(σ, τ_i).$$

Referring now to FIG. 3, a diagram of the computation normalized footrule distance for a collection of lists is shown. In this case, k=5. Individual distances are computed, summed, and normalized by dividing the result by k.

One can also define generalizations of these distance measures to partial lists. If $τ_1, \ldots, τ_k$ are partial lists, let U denote the union of elements in $τ_1, \ldots, τ_k$, and let σ be a full list with respect to U. Now, given σ, the idea is to consider the distance between $τ_i$ and the projection of σ, with respect to $τ_i$. Then, for instance, one has the induced footrule distance:

$$F(σ, τ_1, \ldots, τ_k) = (1/k) \Sigma_i F(σ_{|τi}, τ_i).$$

In a similar manner, induced Kendall tau distance can be defined. Finally, a third notion of distance is defined that measures the distance between a full list and a partial list on the same universe:

(3) Given one full list and a partial list, the scaled footrule distance weights contributions of elements based on the length of the lists they are present in. More formally, if a is a full list and τ is a partial list, then:

$$SF(σ, τ) = \Sigma_{i\ in\ τ} |(σ(i)/|τ|) - (τ(i)/|τ|)|.$$

SF is normalized by dividing by $|τ|/2$.

Referring now to FIG. 4, a diagram of the computation of scaled footrule distance given a full list and a partial list is shown. The lists are as described above, but in this instance τ has only four elements. Note that these distances are not necessarily metrics. To a large extent, experimental results will be interpreted in terms of these distance measures.

Optimal Rank Aggregation

In the generic context of rank aggregation, the notion of "better" depends on what distance measure to be optimized. Suppose Kendall distance is to be optimized; the problem then is: given (full or partial) lists $τ_1, \ldots, τ_k$, find a σ such that σ is a full list with respect to the union of the elements of $τ_1, \ldots, τ_k$, and σ minimizes $K(σ, τ_1, \ldots, τ_k)$. In other words, for a collection of partial lists $τ_1, \ldots, τ_k$ and a full list σ, denote $SK(σ, τ_1, \ldots, τ_k)$ by the sum:

$$SK(σ, τ_1, \ldots τ_k) = \sum_{i=1}^{k} K(σ, τ_i).$$

The aggregation obtained by minimizing $SK(σ, τ_1, \ldots, τ_k)$ over all permutations σ (that is, optimizing Kendall distance), is called a Kemeny optimal aggregation and in a precise sense, corresponds to the geometric median of the inputs. In general, the Kemeny optimal solution is not unique.

Computing the Kemeny optimal aggregation is NP-hard even when k=4. Note that in contrast to the social choice scenario where there are many voters and relatively few candidates, in the web aggregation scenario there are many candidates (pages) and relatively few voters (the search engines).

Kemeny optimal aggregations have a maximum likelihood interpretation. Suppose there is an underlying "correct" ordering σ of S, and each order., $τ_1, \ldots, τ_k$ is obtained from σ by swapping two elements with some probability less than ½. Thus, the τ's are "noisy" versions of σ. A Kemeny optimal aggregation of $τ_1, \ldots, τ_k$, is one that is maximally likely to have produced the τ's (it need not be unique). Viewed differently, Kemeny optimal aggregation has the property of eliminating noise from various different ranking schemes.

Given that a Kemeny optimal aggregation is useful, but computationally hard, how can its properties be capitalized upon in a tractable manner? The following relation shows that Kendall distance can be approximated very well via the Spearman footrule distance.

Proposition 1: For any two full lists σ and τ, $K(σ, τ) \leq F(σ, τ) \leq 2K(σ, τ)$.

This leads to the problem of footrule optimal aggregation. This is the same problem as before, except that the optimizing criterion is now the footrule distance. A polynomial time algorithm to compute optimal footrule aggregation is exhibited below (scaled footrule aggregation for partial lists). Therefore:

Proposition 2: If σ is the Kemeny optimal aggregation of full lists $τ_1, \ldots τ_k$, and σ' optimizes the footrule aggregation, then $$K(σ', τ_1, \ldots, τ_k) < 2K(σ, τ_1, \ldots, τ_k).$$

In other words, any algorithm that computes a footrule optimal aggregation is automatically a 2-approximation algorithm for finding Kemeny optimal aggregations.

Spam Resistance and Condorcet Criteria

In 1770, Borda proposed a particular voting method: for each voter's announced (linear) preference order on the alternatives, a score of zero is assigned to the least preferred alternative, one to the next-least-preferred, and so forth; then the total score of each alternative is computed and the one with the highest score is declared the winner. Borda's method is a "positional" method, in that it assigns a score corresponding to the positions in which a candidate appears within each voter's ranked list of preferences, and the candidates are sorted by their total score.

In 1785, Marie J. A. N. Caritat, Marquis de Condorcet, proposed a voting method, now known as the Condorcet alternative. Under this method, if there is some alternative that defeats every other in pairwise simple majority voting, then that alternative should be ranked first. A natural extension, due to Truchon, mandates that if there is a partition (C, D) of S such that for any x in C and y in D the majority prefers x to y, then x must be ranked above y. This is called the extended Condorcet criterion.

A primary advantage of positional methods (e.g. Borda's method) is that they are computationally very easy: they can be implemented in linear time. They also enjoy the properties called anonymity, neutrality, and consistency in the social choice literature. However, they cannot satisfy the Condorcet criterion. In fact, it is possible to show that no method that assigns a weights to each position and then sorts the results by applying a function to the weights associated with each candidate satisfies the Condorcet criterion. However, the extended Condorcet criterion can be achieved efficiently in rank aggregations.

A strong connection is now established between satisfaction of the extended Condorcet criterion and fighting search engine "spam." Kemeny optimal aggregations are essentially the only ones that simultaneously satisfy natural and important properties of rank aggregation functions, called neutrality and consistency in the social choice literature, and the Condorcet criterion. Indeed, Kemeny optimal aggregations even satsify the extended Condorcet criterion, which, described in terms of meta-searching states that if the set of returned search results can be partitioned such that all members of a subset of one partition (X*="non-spam") defeat all alternatives in the complement (X="spam"), then in the aggregated search results, all the non-spam elements outrank all the spam elements.

Intuitively, a search engine has been spammed by a page in its index, on a given query, if it ranks the page "too highly" with respect to other pages in the index, in the view of a "typical" user. Indeed, in accord with this intuition, search engines are both rated and trained by human evaluators. This approach to defining spam:

(1) permits an author to raise the rank of her page by improving the content;
(2) puts ground truth about the relative value of pages into the purview of the users—in other words, the definition does not assume the existence of an absolute ordering that yields the "true" relative value of a pair of pages on a query;
(3) does not assume unanimity of users' opinions or consistency among the opinions of a single user; and
(4) suggests some natural ways to automate training of engines to incorporate useful biases, such as geographic bias.

Reliance on evaluators in defining spam is probably unavoidable. If the evaluators are human, the typical scenario during the design and training of search engines, then the eventual product will incorporate the biases of the training evaluators. The evaluators are modeled by the search engine ranking functions. That is, one makes the simplifying assumption that for any pair of pages, the relative ordering by the majority of the search engines comparing them is the same as the relative ordering by the majority of the evaluators. The intuition is that if a page spams all or even most search engines for a particular query, then no combination of these search engines can defeat the spam. This is reasonable: Fix a query; if for some pair of pages a majority of the engines is spammed, then the aggregation function is working with overly bad data—garbage in, garbage out. On the other hand, if a page spams strictly fewer than half the search engines, then a majority of the search engines will prefer a "good" page to a spam page. In other words, under this definition of spam, the spam pages are the Condorcet losers, and will occupy the bottom partition of any aggregated ranking that satisfies the extended Condorcet criterion. Similarly, assuming that good pages are preferred by the majority to mediocre ones, these will be the Condorcet winners, and will therefore be ranked highly.

Many of the existing aggregation methods do not ensure the election of the Condorcet winner, should one exist. The aim here is to obtain a simple method of modifying any initial aggregation of input lists so that the Condorcet losers (spam) will be pushed to the bottom of the ranking during this process. This procedure is called local Kemenization.

Local Kemenization

The notion of a locally Kemeny optimal aggregation is introduced; it is a relaxation of Kemeny optimality that ensures satisfaction of the extended Condorcet principle and yet remains computationally tractable. As the name implies, local Kemeny optimal is a "local" notion that possesses some of the properties of a Kemeny optimal aggregation.

A full list $\pi$ is a locally Kemeny optimal aggregation of partial lists $\tau_1, \tau_2, \ldots, \tau_k$, if there is no full list $\pi'$ that can be obtained from $\pi$ by performing a single transposition of an adjacent pair of elements and for which $K(\pi', \tau_1, \tau_2, \ldots, \tau_k) < K(\pi, \tau_1, \tau_2, \ldots, \tau_k)$. In other words, it is impossible to reduce the total distance to the $\pi$'s by flipping an adjacent pair.

Every Kemeny optimal aggregation is also locally Kemeny optimal, but the converse is false. Nevertheless, a locally Kemeny optimal aggregation satisfies the extended Condorcet property and can be computed in time $O(kn \log n)$, where k is the number of lists and n is the number of alternatives.

The value of the extended Condorcet criterion in increasing resistance to search engine spam and in ensuring that elements in the top partitions remain highly ranked has been discussed. However, specific aggregation techniques may add considerable value beyond simple satisfaction of this criterion; in particular, they may produce good rankings of alternatives within a given partition (as noted above, the extended Condorcet criterion gives no guidance within a partition).

It is now shown that, using any initial aggregation $\mu$ of partial lists $\tau_1, \tau_2, \ldots, \tau_k$—one that is not necessarily Condorcet—one can efficiently construct a locally Kemeny optimal aggregation of the $\tau$'s that is in a well-defined sense maximally consistent with $\mu$. For example, if the $\tau$'s are full lists then $\mu$ could be the Borda ordering on the alternatives. Even if a Condorcet winner exists, the Borda ordering may not rank it first. However, by applying the "local Kemenization" procedure (described below), a ranking is obtained that is maximally consistent with the Borda ordering but in which the Condorcet winners are at the top of the list.

A local Kemenization (LK) of a full list p with respect to $\tau_1, \ldots, \tau_k$ is a procedure that computes a locally Kemeny optimal aggregation of $\tau_1, \ldots, \tau_k$ that is maximally consistent with $\mu$. Intuitively, this approach also preserves the strengths of the initial aggregation $\mu$. Thus:

(1) the Condorcet losers receive low rank, while the Condorcet winners receive high rank (this follows from local Kemeny optimality)
(2) the result disagrees with $\mu$ on the order of any given pair (i,j) of elements only if a majority of those $\tau$'s expressing opinions disagrees with $\mu$ on (i,j).
(3) for every d between 1 and $|\mu|$, the length d prefix of the output is a local Kemenization of the top d elements in $\mu$.

Thus, if $\mu$ is an initial meta-search result, and the top, say, 100 elements of $\mu$ contain enough good pages, then one can build a locally Kemeny optimal aggregation of the projections of the $\tau$'s onto the top 100 elements in $\mu$.

Figure 5:
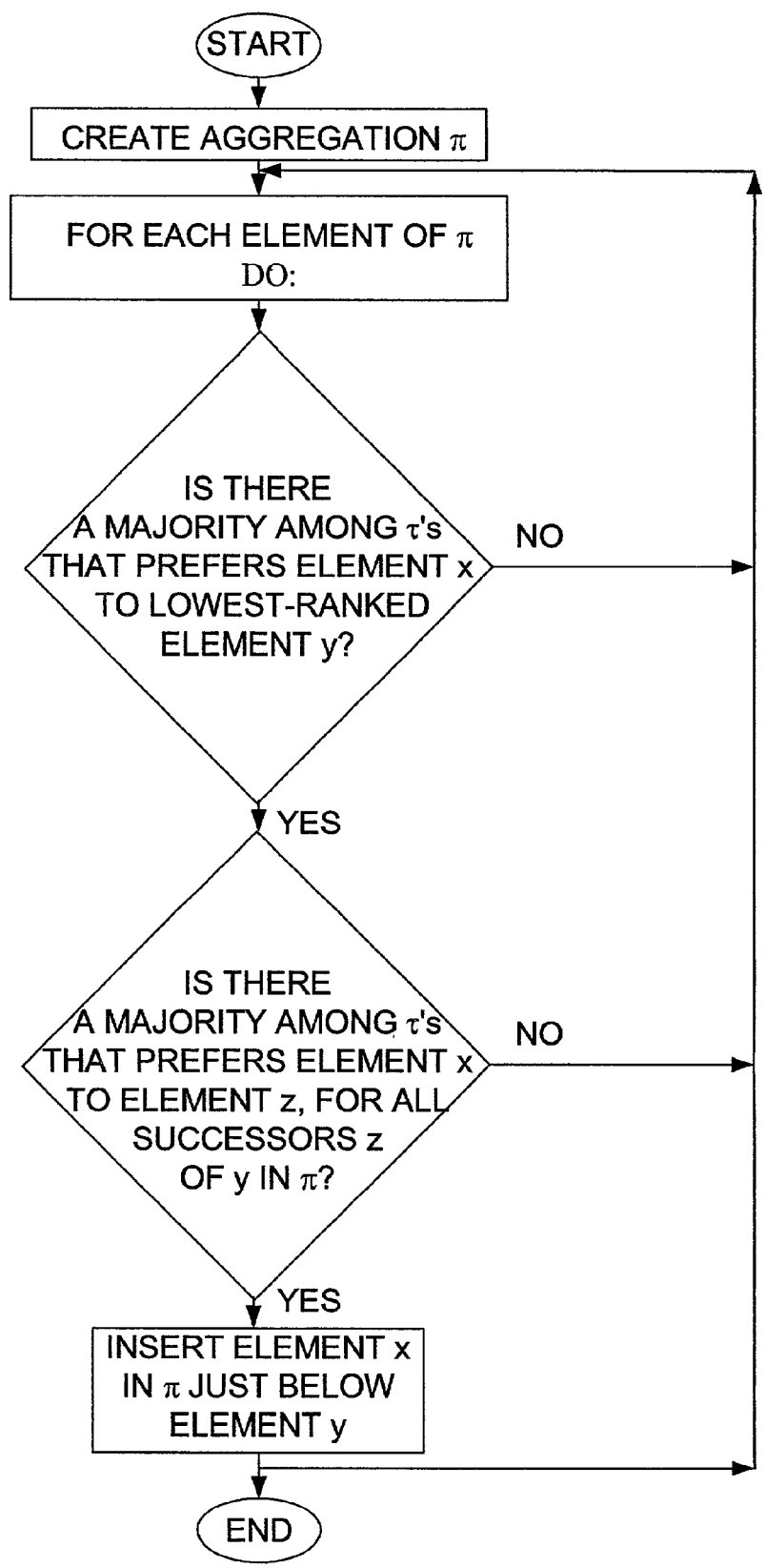
FIG. 5 is a flowchart of the computation of a locally Kemeny optimal aggregation.

Referring now to FIG. 5, a flowchart of the computation of a locally Kemeny optimal aggregation is shown. The local Kemenization procedure is a simple inductive construction that runs in time proportional to the Kendall distance between $\mu$ and the locally Kemenized solution. Without loss of generality, let $\mu=(1, 2, \ldots, |\mu|)$. Assume inductively for that one has constructed $\pi$, a local Kemenization of the projection of the $\tau$'s onto the elements $1, \ldots, /-1$. Insert element/into the lowest-ranked "permissible" position in $\pi$: just below the lowest-ranked element $\pi$ in n such that (a) no majority among the (original) $\tau$'s prefers x to y and (b) for all successors z of y in $\pi$ there is a majority that prefers x to z. In other words, one tries to insert x at the end (bottom) of the list $\pi$; one bubbles it up toward the top of the list as long as a majority of the τ's insists that one does so. A rigorous treatment of local Kemeny optimality and local Kemenization is given below, where it is also shown that the local Kemenization of an aggregation is unique.

On the strength of these results the following general approach to rank aggregation is suggested:

Given $\tau_1, \ldots, \tau_k$, use any favorite aggregation method to obtain a full list μ.

Output the (unique) local Kemenization of μ with respect $\tau_1, \ldots, \tau_k$ Specific Rank Aggregation Methods Different aggregation methods and their adaptations to both full and partial lists are described below.

Borda's Method

Full lists: Given full lists $\tau_1, \ldots, \tau_k$, for each candidate c in S and list $\tau_i$, Borda's method first assigns a score $B_i(c)$=the number of candidates ranked below c in $\tau_i$, and the total Borda score B (c) is defined as $\Sigma_i B_i(c)$. The candidates are then sorted in decreasing order of total Borda score.

Borda's method can be thought of as assigning a k-element position vector to each candidate (the positions of the candidate in the k lists), and sorting the candidates by the $L_1$ norm of these vectors. Of course, there are plenty of other possibilities with such position vectors: sorting by $L_p$ norms for p>1, sorting by the median of the k values, sorting by the geometric mean of the k values, etc. This intuition leads to several Markov chain based approaches.

Partial lists: It has been proposed that the right way to extend Borda to partial lists is by apportioning all the excess scores equally among all unranked candidates. This idea stems from the goal of being unbiased, however, it is easy to show that for any method of assigning scores to unranked candidates, there are partial information cases in which undesirable outcomes occur.

Footrule and Scaled Footrule

Since the footrule optimal aggregation is a good approximation of Kemeny optimal aggregation (by Proposition 2), it merits investigation.

Full lists: Footrule optimal aggregation is related to the median of the values in a position vector:

Proposition 3: Given full lists $\tau_1, \ldots, \tau_k$, if the median positions of the candidates in the lists form a permutation, then this permutation is a footrule optimal aggregation.

An algorithm for footrule optimal aggregation is obtained via the following proposition:

Proposition 4: Footrule optimal aggregation of full lists can be computed in polynomial time, specifically, the time to find a minimum cost perfect matching in a bipartite graph.

Proof (Sketch):

Let the union of $\tau_1, \ldots, \tau_k$ be S with n elements. Now, define a weighted complete bipartite graph (C, P, W) as follows. The first set of nodes C={1, ..., n} denotes the set of elements to be ranked (pages). The second set of nodes P={1, ..., n} denotes the n available positions. The weight W(c, p) is the total footrule distance (from the $\tau_i$'s) of a ranking that places element c at position p, given by W(c, p)=$\Sigma_i |\tau_i(c)-p|$. It can be shown that a permutation minimizing the total footrule distance to the $\tau_i$'s is given by a minimum cost perfect matching in the bipartite graph.

Partial lists: The computation of a footrule-optimal aggregation for partial lists is more problematic. In fact, it can be shown (see Appendix B) to be equivalent to the NP-hard problem of computing the minimum number of edges to delete to convert a directed graph into a DAG.

Keeping in mind that footrule optimal aggregation for full lists can be recast as a minimum cost bipartite matching problem, a method that retains the computational advantages of the full list case and is reasonably close to it in spirit is described. The bipartite graph is defined as before, except that the weights are defined differently. The weight W(c, p) is the scaled footrule distance (from the $\tau_i$'s) of a ranking that places element c at position p, given by $$W(c, p) = \Sigma_i |(\tau_i(c)/|\tau_i|)-(p/n)|.$$

As before, the minimum cost maximum matching problem on this bipartite graph is solved to obtain the footrule aggregation algorithm for partial lists. This method is called the scaled footrule aggregation (SFO).

Markov Chain Methods

A general method for obtaining an initial aggregation of partial lists is proposed, using Markov chains. The states of each Markov chain correspond to the n candidates to be ranked, and the states' transition probabilities depend in some particular way on the given (partial) lists. The stationary probability distribution of the Markov chain is used to sort the n candidates to produce the final ranking. There are several motivations for using Markov chains:

Handling partial lists and top d lists: Rather than require every pair of pages (candidates) i and j to be compared by every search engine (voter), the available comparisons between i and j are used to determine the transition probability between i and j, and exploit the connectivity of the chain to (transitively) "infer" comparison outcomes between pairs that were not explicitly ranked by any of the search engines. The intuition is that Markov chains provide a more holistic viewpoint of comparing all n candidates against each other—significantly more meaningful than ad hoc and local inferences like "if a majority prefer A to B and a majority prefer B to C, then A should be better than C."

Handling uneven comparisons: If a web page P appears in the bottom half of about 70% of the lists, and is ranked Number 1 by the other 30%, how important is the quality of the pages that appear on the latter 30% of the lists? If these pages all appear near the bottom on the first set of 70% of the lists and the winners in these lists were not known to the other 30% of the search engines that ranked P Number 1, then perhaps one shouldn't consider P too seriously. In other words, if each list is viewed as a tournament within a league, one should take into account the strength of the schedule of matches played by each player. The Markov chain solutions discussed are similar in spirit to the approaches considered in the mathematical community for this problem (eigenvectors of linear maps, fixed points of nonlinear maps, etc.).

Enhancements of other heuristics: Heuristics for combining rankings are motivated by some underlying principle. For example, Borda's method is based on the idea "more wins is better." This gives some figure of merit for each candidate. It is natural to extend this and say "more wins against good players is even better," and so on, and iteratively refine the ordering produced by a heuristic. In the context of web searching, the HITS algorithm of Kleinberg and the PageRank algorithm of Brin and Page are motivated by similar considerations. Some of the chains proposed are natural extensions (in a precise sense) of Borda's method, sorting by geometric mean, and sorting by majority.

Computational efficiency: In general, setting up one of these Markov chains and determining its stationary probability distribution takes about $\theta(n^2k+n^3)$ time. However, in practice, if one explicitly computes the transition matrix in $O(n^2k)$ time, a few iterations of the power method will allow one to compute the stationary distribution. An even faster method is suggested for practical purposes. For all of the chains that proposed, with about O(nk) (linear in input size) time for preprocessing, it is usually possible to simulate one step of the chain in O(k) time; thus by simulating the Markov chain for about O(n) steps, one should be able to sample from the stationary distribution pretty effectively. This is usually sufficient to identify the top few candidates in the stationary distribution in O(nk) time, perhaps considerably faster in practice.

Specific Markov chains are now proposed, denoted as MC1, MC2, MC4 and MC4. For each of these chains, the transition matrix is specified, and some intuition is given as to why such a definition is reasonable. In all cases, the state space is the union of the sets of pages ranked by various search engines.

MC1: If the current state is page P, then the next state is chosen uniformly from the multiset of all pages that were ranked higher than (or equal to) P by some search engine that ranked P, that is, from the multiset of all pages Q such that $\tau_i(Q)$ at most $\tau_i(P)$. The main idea is that in each step, one moves from the current page to a better page, allowing about 1/j probability of staying in the same page, where j is roughly the average rank of the current page.

MC2: If the current state is page P, then the next state is chosen by first picking a ranking $\tau$ uniformly from all the partial lists $\tau_1, \ldots, \tau_k$ containing P, then picking a page Q uniformly from the set of all pages Q such that $\tau(Q)$ is at most $\tau(P)$. This chain takes into account the fact that there are several lists of rankings, not just a collection of pairwise comparisons among the pages. As a consequence, MC2 is arguably the most representative of minority viewpoints of sufficient statistical significance; it also protects specialist views. In fact, MC2 generalizes the geometric mean analogue of Borda's method. For full lists, if the initial state is chosen uniformly at random, after one step of MC2, the distribution induced on its states produces a ranking of the pages such that P is ranked higher than (preferred to) Q iff the geometric mean of the ranks of P is lower than the geometric mean of the ranks of Q.

MC3: If the current state is page P, then the next state is chosen as follows: first pick a ranking $\tau$ uniformly from all the partial lists $\tau_1, \ldots, \tau_k$ containing P, then uniformly pick a page Q that was ranked by $\tau$. If $\tau(Q)<\tau(P)$ then go to Q, else stay in P. This chain is a generalization of Borda method. For full lists, if the initial state is chosen uniformly at random, after one step of MC3, the distribution induced on its states produces a ranking of the pages such that P is ranked higher than Q iff the Borda score of P is higher than the Borda score of Q. This is natural, considering that in any state P, the probability of staying in P is roughly the fraction of pairwise contests (with all other pages) that P won, which is a very Borda-like measure.

MC4: If the current state is page P, then the next state is chosen as follows: first pick a page Q uniformly from the union of all pages ranked by the search engines. If $\tau(Q)<\tau(P)$ for a majority of the lists $\tau$ that ranked both P and Q, then go to Q, else stay in P. This chain generalizes Copeland's suggestion of sorting the candidates by the number of pairwise majority contests they have won, a method that satisfies the extended Condorcet criterion and is fairly easy to compute in $O(n^2k)$ time.

One can also show that the Markov ordering implied by these chains need not satisfy the extended Condorcet criterion.

Results of Experimental Testing

Three types of experiments were conducted to determine the effectiveness of the various embodiments of the present invention. First, a meta-search engine was constructed and evaluated using different aggregation methods. Next, the aggregation techniques of the invention were evaluated for effectiveness in combating "spam". Finally, word association for multi-word queries was tested. Seven commercial search engines were employed in the testing, and only the top 100 results were considered from each.

The following table describes the performance of various rank aggregation methods for the meta-search experiment, in which 38 general queries were run on the commercial search engines. The performance data in the table is calculated in terms of the three distance measures described above. Each row corresponds to a specific method described above.

TABLE 1

|  | Kendall Tau No LK | Kendall Tau With LK | Induced Footrule No LK | Induced Footrule With LK | Scaled Footrule No LK | Scaled Footrule With LK |
| --- | --- | --- | --- | --- | --- | --- |
| Borda | 0.221 | 0.214 | 0.353 | 0.345 | 0.440 | 0.438 |
| SFO | 0.112 | 0.111 | 0.168 | 0.167 | 0.137 | 0.137 |
| MC1 | 0.133 | 0.130 | 0.216 | 0.213 | 0.292 | 0.291 |
| MC2 | 0.131 | 0.128 | 0.213 | 0.210 | 0.287 | 0.286 |
| MC3 | 0.116 | 0.114 | 0.186 | 0.183 | 0.239 | 0.239 |
| MC4 | 0.105 | 0.104 | 0.151 | 0.149 | 0.181 | 0.181 |

Of all the methods employed in meta-search testing, MC4 outperforms all others evaluated, and is thus the preferred embodiment of the invention. The margin by which MC4 beats Borda is huge, which is surprising since Borda's method is the usual choice of aggregation in the prior art, and perhaps the most natural. Scaled footrule and MC3 (a generalization of Borda) seem to be on par with each other. Recall that the footrule procedure for partial lists was only a heuristic modification of the footrule procedure for full lists. The experimental evidence suggests that this heuristic is very good. MC1 and MC2 are always worse than the other Markov chains, but they are strictly better than Borda.

In general, local Kemenization seems to improve the distance measures around 1–3%. It can be shown formally that local Kemenization never does worse in the sense that the Kendall distance never deteriorates after local Kemenization. Interestingly, this seems to be true even for footrule and scaled footrule distances (although this may not always be true). The local Kemenization procedure is always worth applying: either the improvement is large and if not, then the time spent is small.

Several queries were run on the commercial search engines, and the top web pages (URLs) deemed to be "spam" (i.e. pages awarded an undeservedly high rank from one or more search engines) were identified. The rows of the following table list some URLs that "spammed" at least two search engines. The entries in the table are the ranks of particular URLs returned by the search engines. A blank entry indicates that the URL was not returned as one of the top 100 by the search engine. The first several columns of the table represent the six search engines, each of which was "spammed" along with one other reference engine. The final two columns of the table are the rank results of two aggregation methods, SFO and MC4, each with local Kemenization.

TABLE 2

|      | S1 | S2 | S3 | S4 | S5 | S6 | SFO | MC4 |
|------|----|----|----|----|----|----|-----|-----|
| URL1 | 4  | 43 |    |    | 41 |    | 144 | 63  |
| URL2 |    | 9  | 51 |    | 5  |    | 31  | 59  |
| URL3 | 11 | 14 | 26 |    | 13 |    | 49  | 36  |
| URL4 | 84 | 19 | 1  |    | 17 |    | 77  | 93  |
| URL5 |    | 9  |    | 63 | 11 |    | 49  | 121 |
| URL6 |    | 18 |    | 6  | 16 |    | 23  | 66  |
| URL7 | 26 | 16 |    | 26 | 12 | 16 | 57  | 54  |
| URL8 |    | 25 |    |    | 21 |    | 78  | 67  |
| URL9 |    | 34 |    |    | 29 |    | 108 | 101 |

Experimental results indicate that SFO and MC4 are quite effective in combating spam, i.e. the output rank of each URL was usually lower than originally indicated by the search engines, often remarkably lower. While the methods described herein do not completely eliminate spam, testing shows that they do reduce spam in general.

Test results also show that the technique of word association combined with rank aggregation methods can improve the quality of search results for multi-word queries. The Google (TM) search engine ran numerous multi-word queries during this phase of experimentation. The number or quality of web pages returned for many interesting multi-word queries is not very high (typically only around 10–15 pages are returned, and the top 5 results are often very poor), a direct consequence of the Google (TM) engine's AND semantics being applied to a list of several query words. In sharp contrast, the URLs produced by the rank aggregation methods usually contained a wealth of information about the query topic.

A general purpose computer is programmed according to the inventive steps herein. The invention can also be embodied as an article of manufacture—a machine component— that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device. While the particular SYSTEM AND METHOD FOR AGGREGATING RANKING RESULTS FROM VARIOUS SOURCES TO IMPROVE THE RESULTS OF WEB SEARCHING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

APPENDIX A

Local Kemenization

Begin with a formal definition:
  Definition 5
  A permutation $\pi$ is a locally Kemeny optimal aggregation of partial lists $\tau_1, \tau_2, \ldots, \tau_k$, if there is no permutation $\pi'$ that can be obtained from $\pi$ by performing a single transposition of an adjacent pair of elements and for which $K(\pi', \tau_1, \tau_2, \ldots \tau_k) < K(\pi, \tau_1, \tau_2, \ldots, \tau_k)$. In other words, it is impossible to reduce the total distance to the $\tau$'s by flipping an adjacent pair.

Note that the above definition is not equivalent to requiring that no flipping of any (not necessarily adjacent) pair will decrease the sum of the distances to the $\tau$'s.

EXAMPLE 1

$\pi=(1,2,3), \tau_1=(1,2), \tau_2=(2,3), \tau_3=\tau_4=\tau_5=(3,1)$.

Given that $\pi$ satisfies Definition 5, $K(\pi, \tau_1, \tau_2, \ldots, \tau_5)=3$, but transposing 1 and 3 decreases the sum to 2.

Every Kemeny optimal permutation is also locally Kemeny optimal, but the converse does not hold (cf. Example 1). Furthermore, a locally Kemeny optimal permutation is not necessarily a good approximation for the optimal. For example, if the $\tau$'s are as in Example 1, the number of (3,1) partial lists is very large, and there is only one occurrence of each of the partial lists (1,2) and (2,3), then (1,2,3) is still locally Kemeny optimal, but the ratio of the SK to the optimal may be arbitrarily large. Nevertheless, the important observations, proved next, are that a locally Kemeny optimal aggregation satisfies the extended Condorcet property and can be computed efficiently.

Convention
  Recall the convention that $\pi$ ranks x above y (i.e., prefers x to whenever $\pi(x)<\pi(y)$.

Lemma 6
  Let $\pi$, a permutation on alternatives $\{1, \ldots, n\}$, be a locally Kemeny optimal aggregation for partial lists $\tau_1, \tau_2, \ldots, \tau_k$. Then $\pi$ satisfies the extended Condorcet criterion with respect to $\tau_1, \tau_2, \ldots, \tau_k$.

Proof
  If the lemma is false then there exist partial lists $\tau_1, \tau_2, \ldots, \tau_k$, a locally Kemeny optimal aggregation $\pi$, and a partition (T, U) of the alternatives where for all a in T and b in U the majority among $\tau_1, \tau_2, \ldots, \tau_k$ prefers a to b, but there are c in T and d in U such that $\pi(d)<\pi(c)$. Let (d,c) be a closest (in $\pi$) such pair. Consider the immediate successor of d in $\pi$, call it e. If e=c then c is adjacent to d in $\pi$ and transposing this adjacent pair of alternatives produces a $\pi'$ such that $K(\pi', \tau_1, \tau_2, \ldots, \tau_k) < K(\pi, \tau_1, \tau_2, \ldots, \tau_k)$, contradicting the assumption that $\pi$ is a locally Kemeny optimal aggregation of the $\tau$'s. If e does not equal c, then either e is in T, in which case the pair (d,e) is a closer pair in $\pi$ than (d,c) and also violates the extended Condorcet condition, or e is in U, in which case (e,c) is a closer pair than (d,c) that violates the extended Condorcet condition. Both cases contradict the choice of (d,c). The set $\tau_1, \tau_2, \ldots, \tau_k$ of partial lists defines a directed majority graph G on the n alternatives, with an edge (x,y) from x to y if a majority of the $\tau$'s that contain both x and y rank x above y.

Lemma 7

Locally Kemeny optimal aggregations of k lists can be computed in O(kn log n) time.

Proof

It is not surprising that locally Kemeny optimal aggregations can be found in polynomial time because they are only local minima. A straightforward approach requires $O(n^2)$ time; a technique requiring only O(kn log n) time is described (generally, one is interested in the case in which k is much smaller than n).

Consider the majority graph T for $\tau_1, \tau_2, \ldots, \tau_k$ with anti-parallel edges in the case of a tie. The problem of finding a locally Kemeny optimal aggregation of $\tau_1, \tau_2, \ldots \tau_k$ is now equivalent to finding a Hamiltonian path in this graph. Due to the density of the edges it is possible to find such a path in T in O(n log n) probes to the edges of T using, for instance, a mergesort-like algorithm (the advantage of using mergesort is that the issue of inconsistent answers never arises, which simplifies the execution of the algorithm). Note that T need not be constructed explicitly. The cost of each probe is k accesses to the partial lists (to find out whether there is a majority), so the resulting complexity is O(kn log n).

Next, the details of the local Kemenization procedure are described. Recall that the value of local Kemenization is that, given an aggregation $\mu$ of several rankings, it produces a ranking $\pi$ that achieves the best of both worlds: $\pi$ satisfies the extended Condorcet criterion, and $\pi$ is maximally consistent with $\mu$. The notion of consistency is formalized.

Definition 8

Given partial lists $\tau_1, \tau_2, \ldots, \tau_k$, and a total order $\mu$, $\pi$ is said to be consistent with $\mu$ and $\tau_1, \tau_2, \ldots, \tau_k$ if $\pi(i) < \pi(j)$ implies that either (a) $\mu(i) < \mu(j)$ or (b) a majority of $\tau_1, \tau_2, \ldots, \tau_k$ prefer i to j (more prefer i over than j over i, but not necessarily an absolute majority).

In other words, the order of two elements differs between $\mu$ and $\pi$ only if a majority of the $\tau$'s support the change (however, consistency does not mandate a switch). Note that if $\pi$ is consistent with $\mu$ and $\tau_1, \tau_2, \ldots, \tau_k$, then $$K(\pi, \tau_1, \tau_2, \ldots, \tau_k) \leq K(\mu, \tau_1, \tau_2, \ldots, \tau_k),$$

since the only allowed changes decrease the distance to the $\tau$'s.

The proof of the next lemma is straightforward from Definition 8.

Lemma 9

If $\pi$ is consistent with $\mu$ and $\tau_1, \tau_2, \ldots, \tau_k$, then for any $1 \leq l \leq n$, if S is the set of/alternatives ranked most highly by $\mu$, the projection of $\pi$ onto S is consistent with the projections of $\mu$ and $\tau_1, \tau_2, \ldots, \tau_k$ onto S.

For any partial lists $\tau_1, \tau_2, \ldots \tau_k$, and order $\mu$ there is a permutation $\pi$ that is (i) locally Kemeny optimal and (ii) consistent with $\mu$. Such a $\pi$ is not necessarily unique. Particular focus is on $\mu$-consistent locally Kemeny optimal aggregations that, when restricted to subsets S of the most highly ranked elements in $\mu$, retain their local Kemeny optimality (Definition 10 below). This is desirable whenever one is more sure of the significance of the top results in $\mu$ than the bottom ones. In this case the solution is unique (Theorem 11).

Definition 10

Given partial lists $\tau_1, \tau_2, \ldots, \tau_k$ and a total order $\mu$ on alternatives $\{1, 2, \ldots, n\}$, $\pi$ is a local Kemenization of $\mu$ with respect to $\tau_1, \tau_2, \ldots, \tau_k$, if (1) $\pi$ is consistent with $\mu$ and (2) if attention is restricted to the set S consisting of the $1 \leq l \leq n$ most highly ranked alternatives in $\mu$, then the projection of $\pi$ onto S is a locally Kemeny optimal aggregation of the projections of $\tau_1, \tau_2, \ldots, \tau_k$ onto S.

Theorem 12

For any partial lists $\tau_1, \tau_2, \ldots, \tau_k$ and order $\mu$ on alternatives $\{1, \ldots, n\}$, there exists a unique local Kemenization of $\mu$ with respect to $\tau_1, \tau_2, \ldots, \tau_k$.

Proof

The theorem is proven by induction on n, the number of alternatives. The base case n=1 is trivial. Assume the statement inductively for n−1. Proof is then given for n. Let x be the last (lowest-ranked) element in $\mu$ and let $S = \{1, \ldots, n\} - \{x\}$. Since S is of size n−1, by induction there is a unique permutation $\pi_{n-1}$ on the elements in S satisfying the conditions of the theorem. Now insert the removed element x into the lowest-ranked "permissible" position in $\pi_{n-1}$: just below the lowest-ranked element y such that such that (a) no majority among the (original) $\tau$'s prefers x to y and (b) for all successors z of y (i.e., $\rho_{n-1}(y) < \rho_{n-1}(z)$) there is a majority that prefers x to z. Clearly no two elements of $\mu$ were switched unnecessarily and the solution, $\pi$, is locally Kemeny optimal from the local Kemeny optimality of $\pi_{n-1}$ and the majority properties. Note that the consistency condition requires that x be as low in $\pi$ as local Kemeny optimality permits, so given $\pi_{n-1}$ there is only one place in which to insert x.

Suppose now that $\mu$ and $\tau_1, \tau_2, \ldots, \tau_k$ contradict uniqueness: there are two different local Kemenizations of $\mu$ with respect to $\tau_2, \ldots, \tau_k$; call them $\pi$ and $\pi'$. If the last element x in $\mu$ is dropped and let S be as above, then (by property (ii) of local Kemenization) the resulting permutations $\pi_{n-1}$ and $\pi'_{n-1}$ must each be local Kemenizations of the restrictions of the $\tau$'s to S and (by property (i) and Lemma 9) they must be consistent with the restriction of $\mu$ to S. By the induction hypothesis $\pi_{n-1} = \pi'_{n-1}$ As argued above, there is only one place to insert x into this list. The algorithm suggested by this proof may take $O(n^2 k)$ time in the worst case (say a transitive tournament where $\mu$ is the anti-transitive order). However, in general it requires time proportional to the Kendall distance between $\mu$ and the solution. It is not expected that $\mu$ is uncorrelated with the solution and therefore better performance in practice is anticipated.

APPENDIX B

Complexity of Kemeny Optima

In this section, the complexity of finding a Kemeny optimal permutation is studied. Computing a Kemeny optimal permutation is shown to be NP-hard, even when the input consists of four full lists $\tau_1, \tau_2, \tau_3, \tau_4$. For partial lists of length 2 finding a Kemeny optimal solution is exactly the same problem as finding a minimum feedback arc set, and hence is NP-hard. The problem is also known to be NP-hard for an unbounded number of complete lists.

Computing a Kemeny optimal permutation for two lists is trivial—simply output one of the input lists. The complexity of computing a Kemeny optimal permutation for three full lists is open; this problem is later shown to be reducible to the problem of finding minimum feedback edge sets on tournament graphs, which, as far as is known, is open as well.

Computing a Kemeny optimal permutation for an unbounded number of partial lists is easily seen to be NP-hard by a straightforward encoding of the feedback edge set problem: for each edge (i,j), create a partial list of two elements: i followed by j.

Theorem 11

The problem of computing a Kemeny optimal permutation for a given collection of k full lists, for even integers k>=4, is NP-hard. The corresponding decision problem is NP-complete.

Proof

The reduction is from the feedback edge set problem. Given a directed graph G=(V,E), and an integer L>=0, the question is whether there exists a subset F of E such that $|F| \leq L$ and (V, E−F) is acyclic. Let n=|V| and m=|E|. Given G, one first produces a graph G'=(V', E') by "splitting" each edge of G into two edges; formally, let V' denote the union of V and the set $\{V_e: e$ is in $E\}$ and E'={(i, $v_{i,j}$), ($v_{i,j}$, j) : (i,j) in E}. The easy fact that is later used is that G has a feedback edge set of size L if and only if G' does.

Arbitrarily order all the vertices of G' so that the vertices in V receive the numbers 1, . . . , n (and the vertices of the form $v_e$ receive numbers n+1, . . . , n+m). This ordering i denoted by Z For a vertex i in V, let out(i) denote a listing of the out-neighbors of i in G' in the order prescribed by Z; similarly let in(i) denote the in-neighbors of i in G' in the order prescribed by Z. Note that none of the lists out(i) or in(i) contains any vertex from the original graph G. Now define four full lists on the set V'. For a list L, the notation $L^r$ denotes the reversal of the list.

$\tau_1$=1, out(1), 2, out(2), . . . , n, out(n)

$\tau_2$=n, out(n)$^r$, n−1, out(n−1 )$^r$, . . . , 1, out(1)$^r$ $\tau_3$=1, in(1), 2, in(2), . . . , n, in(n)

$\tau_4$=n, in(n)$^r$, n−1, in(n−1)$^r$, . . . , 1, in(1)$^r$

The idea is that in $\tau_1$, each vertex in V precedes all its out-neighbors in G', but the ordering of the out-neighbors of a vertex, as well as the ordering of the vertex-neighbor groups are arbitrary (according to Z). The list $\tau_2$ "cancels" the effect of this arbitrariness in ordering the neighbors of a vertex and the vertex-neighbor groups, while "reinforcing" the ordering of each vertex in V above its out-neighbors in G'. Similarly, in $\tau_3$ and $\tau_4$, each vertex of the original vertex set V is preceded by its in-neighbors in G', with suitably arranged cancellations of the artificial ordering among the other pairs.

The main point is that G has a feedback edge set of size L if and only if there is a permutation $\pi$ such that $\Sigma_r K(\pi, \tau_r) \leq L'$, where $$L'=2L+2(n(n-1)/2+m(m-1)/2+m).$$

First suppose that G has a feedback edge set F of size L. It is easy to see that the set F'={(i, $v_{i,j}$) : (i,j) in F} is a feedback edge set of G', and |F'|=L. The graph (V', E'−F') is acyclic, so by topologically sorting the vertices of this graph, an ordering $\pi$ of the vertices in V' is obtained such that for every (i,j) in E'−F', i is placed before j in $\pi$. $\pi$ is claimed to be an ordering that satisfies $K(\pi, \tau_r) \leq L'$.

Note that regardless of how $\pi$ was obtained, the last three terms are inevitable:

(1) for each pair i,j in V, exactly one of $\tau_1$ and $\tau_2$ places i above j and the other places j above i, so there is a contribution of 1 to $K(\pi, \tau_1)+K(\pi, \tau_1)$; similarly, there is a contribution of 1 to $K(\pi, \tau_3)+K(\pi, \tau_4)$. This accounts for the term 2n(n−1)/2.

(2) a similar argument holds for pairs $V_e, V_e$, and there are m(m−1)/2 such pairs, accounting for the term 2m(m−1)/2.

(3) a similar argument holds for pairs $V_{i,j}$, j with respect to $\tau_1$ and $\tau_2$, and for pairs i, $v_{i,j}$, with respect to $\tau_3$ and $\tau_4$. The total number of such pairs is 2m.

The only remaining contribution to the total distance of $\pi$ from the $\tau$'s comes from the i, $v_{i,j}$ pairs with respect to $\tau_1$ and $\tau_2$ (where i precedes $v_{i,j}$ in both lists), and the $v_{i,j}$, j pairs with respect to $\tau_3$ and $\tau_4$ (where $v_{i,j}$ precedes j in both lists). Of these, a pair contributes 2 to the total Kemeny distance $\Sigma_r K(\pi, \tau_r)$ precisely if it occurs as a "back edge" with respect to the topological ordering $\pi$ of the vertices of G'; since (V', E'−F') is acyclic, the total number of such back edges is at most |F|=L.

Conversely, suppose that there exists a permutation $\pi$ that achieves a total Kemeny distance of at most L'=2L+2(n(n−1)/2+m(m−1)/2+m). It has already been argued (in items (1), (2), and (3) above) that $\pi$ must incur a distance of 2(n(n−1)/2+m(m−1)/2+m) with respect to the $\tau$'s, the so the only extra distance between $\pi$ and the $\tau$'s comes from pairs of the form i, $v_{i,j}$ in $\tau_1$ and $\tau_2$, and of the form $v_{i,j}$ j in $\tau_3$ and $\tau_4$. Once again, each such pair contributes either 0 or 2 to the total distance. Consider the pairs that contribute 2 to the distance, and let the corresponding set of edges in E' be denoted by F'. Now, (V', E'−F') is acyclic since every edge that remains in E'−F', by definition, respects the ordering in $\pi$. Thus F' is a feedback edge set of G' of size at most L', and the set F={(i,j) : (i, $v_{i,j}$) in F' OR ($v_{i,j}$, j) in F'} is a feedback edge set of G of size at most L'.

This completes the proof that computing a Kemeny optimal permutation is NP-hard even when the input consists of four full lists. The proof for the case of even k, k>4, is a simple extension: first produce four lists as above, then add (k−4)/2 pairs of lists σ, σ$^r$, where a is an arbitrary permutation. This addition clearly preserves Kemeny optimal solutions; the distance parameter is increased by an additive (k−4) (n+m)(n+m−1)/4 term.

We claim:

1. A computer-implemented method for aggregating rankings comprising:
   constructing an initial aggregated ranking from a plurality of source rankings;
   for each element of the plurality of source rankings;
   a) computing a distance measure comparing a plurality of source rankings output by at least one search engine that has incorrectly estimated the relevance of at least one web page;
   b) altering elements in an altered aggregated ranking to minimize said distance measure, wherein an element is inserted into said altered aggregated ranking only if
      (1) there exists a majority among said source rankings that prefers said element to a lowest-ranked element in said altered aggregated ranking; and (2) there exists a majority among said source rankings that prefers said element to all successors of said lowest-ranked element in said altered aggregated ranking; and outputting the altered aggregated ranking after each element is processed and said altering ends.

2. The method of claim 1 wherein said source rankings include partial rankings.

3. The method of claim 2 wherein said distance measure is an induced distance measure between said initial aggregated ranking and the projection of a full ranking with respect to a union of elements in said partial rankings.

4. The method of claim 1 wherein said incorrect relevance estimate is due to deliberate manipulation of at least one said web page.

5. The method of claim 1 wherein said distance measure describes a level of inconsistency between said plurality of source rankings.

6. The method of claim 1 wherein said distance measure is a Kendall distance.

7. The method of claim 1 wherein said distance measure is a Spearman footrule distance.

8. The method of claim 1 wherein said distance measure is a normalized footrule distance.

9. The method of claim 1 wherein said distance measure is a scaled footrule distance.

10. The method of claim 1 wherein said distance measure is a scaled Kendall distance measure.

11. A computerized system for aggregating rankings comprising:

means for constructing an initial aggregated ranking from a plurality of source rankings;

for each element of the plurality of source rankings:

means for computing a distance measure comparing a plurality of source rankings output by at least one search engine that has incorrectly estimated the relevance of at least one web page;

means for altering elements in an altered aggregated ranking to minimize said distance measure, wherein an element is inserted into said altered aggregated ranking only if (1) there exists a majority among said source rankings that prefers said element to a lowest-ranked element in said altered aggregated ranking; and (2) there exists a majority among said source rankings that prefers said element to all successors of said lowest-ranked element in said altered aggregated ranking; and means for outputting the altered aggregated ranking after each element is processed and said altering ends.

12. A computer program product comprising a machine-readable medium tangibly embodying machine-executable instructions thereon comprising:

a first code means for constructing an initial aggregated ranking from a plurality of source rankings;

for each element of the plurality of source rankings:

a second code means for computing a distance measure comparing a plurality of source rankings output by at least one search engine that has incorrectly estimated the relevance of at least one web page;

a third code means for altering elements in an altered aggregated ranking to minimize said distance measure, wherein an element is inserted into said altered aggregated ranking only if (1) there exists a majority among said source rankings that prefers said element to a lowest-ranked element in said altered aggregated ranking; and (2) there exists a majority among said source rankings that prefers said element to all successors of said lowest-ranked element in said altered aggregated ranking; and a fourth code means for outputting the altered aggregated ranking after each element is processed and said altering ends.

* * * * *